United States Patent [19]

Edinger et al.

[11] 4,327,265
[45] Apr. 27, 1982

[54] METHOD FOR PRODUCING ONE OR MORE CONTACT CONNECTIONS BETWEEN A LACQUER-INSULATED WIRE AND ONE OR MORE CONTACT PARTS OF AN ELECTRIC COMPONENT

[75] Inventors: Egon Edinger, Graefelfing; Friedrich Pedall, Munich, both of Fed. Rep. of Germany

[73] Assignee: Siemens Aktiengesellschaft, Berlin & Munich, Fed. Rep. of Germany

[21] Appl. No.: 133,927

[22] Filed: Mar. 25, 1980

[30] Foreign Application Priority Data

Apr. 23, 1979 [DE] Fed. Rep. of Germany ....... 2916349

[51] Int. Cl.³ ...................... H05B 6/06; B23K 13/00; B23K 31/02
[52] U.S. Cl. .............................. 219/10.41; 219/10.57; 219/9.5; 219/10.77; 219/85 A; 219/87; 219/110; 228/102; 228/179; 228/238; 228/9; 228/103
[58] Field of Search ............... 219/10.41, 10.43, 10.57, 219/9.5, 10.77, 10.71, 85 A, 85 F, 110, 111, 124.34, 87, 91.1, 91.21; 228/103, 105, 102, 178, 179, 180 R, 180 A, 227, 225, 238, 9; 29/602 A, 603

[56] References Cited

U.S. PATENT DOCUMENTS 3,504,149 3/1970 Dixon et al. ......................... 219/9.5
3,573,416 4/1971 Drechsler ........................ 219/110 X
3,858,025 12/1974 Sidbeck et al. ................. 219/124.34
4,180,199 12/1979 O'Rourke et al. .................. 228/102

FOREIGN PATENT DOCUMENTS 2739418 3/1979 Fed. Rep. of Germany ....... 219/9.5

Primary Examiner—B. A. Reynolds
Assistant Examiner—Philip H. Leung
Attorney, Agent, or Firm—Hill, Van Santen, Steadman, Chiara & Simpson

[57] ABSTRACT

A method is disclosed for producing one or more contact connections at solder locations between a lacquer-insulated wire and corresponding contact member of an electrical component by use of soft solder. The solder location is heated to a temperature sufficient to melt the lacquer insulation of the wire off and also to insure a secure electrical connection. Both temperature and electrical contact between the wire and contact member are sensed so as to switch off the heat source at the conclusion of soldering.

1 Claim, 2 Drawing Figures

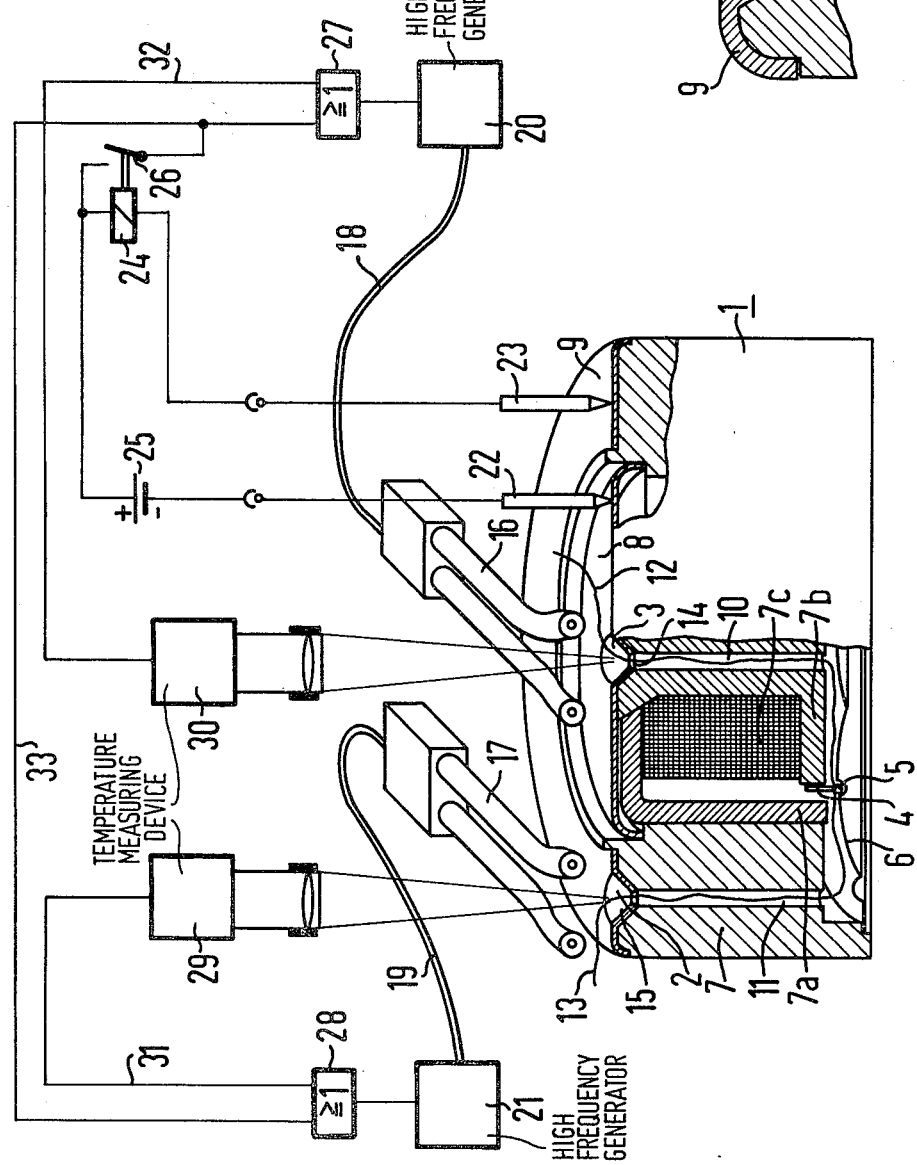

METHOD FOR PRODUCING ONE OR MORE CONTACT CONNECTIONS BETWEEN A LACQUER-INSULATED WIRE AND ONE OR MORE CONTACT PARTS OF AN ELECTRIC COMPONENT

BACKGROUND OF THE INVENTION

The invention relates to a method for producing one or more contact connections between a lacquer-insulated wire and one or more contact parts of an electric component by means of soft soldering by employment of divided soldering and a heat source allocated to each solder location. The heat source remains switched on until the contact part or contact parts and the solder are heated to a temperature which suffices in order to guarantee that the lacquer insulation of the wire melts off on the one hand and, on the other hand, that there is a secure contact connection between wire and contact part or, respectively, contact parts.

A method of this type has become known from the German OS No. 2,739,418, incorporated herein by reference. In this known method, the contact piece is applied to one pole, and the wire is applied to the other pole of an electric control current before the solder location or locations are heated. Subsequently, the parts to be contacted and the solder are heated until an electrical contact arises between the wire and the contact part due to the fact that the lacquer insulation of the wire melts off; this electrical contact is employed for shutting off the heat sources. If both wire ends are to be respectively connected to a contact piece, then two heat sources are required. In this case, the one contact piece is connected to the one pole and the other contact piece is connected to the other pole of the control current circuit. The heat sources are then switched off when both contact connections have been produced.

High frequency coils which are connected to a high frequency generator are preferably employed as heat sources for heating the solder locations. Eddy currents arise in the allocated contact part and in the solder due to the high frequency field, so that both parts are successively heated. This is achieved by matching the high frequency generator to the type of parts to be connected. The high frequency energy makes it possible that first the contact piece and the solder are heated due to their relatively large mass. The thin copper wire experiences only a slowly rising heating through the lacquer coating only directly above the solder which becomes molten until the molten tin melts the wire insulation off, whereupon the heat source is then directly shut off. The heat source's influencing time on the solder location is therefore limited to the time which is absolutely necessary. In this manner, it is possible to even solder relatively thin wires to parts with high heat capacity.

If both wire ends of a coil are to be simultaneously soldered—as is always desired in mass production—then a high frequency coil must be provided for each of the two solder locations. In the method described in the German OS No. 2,739,418, the two high frequency loops are then connected in series and lie at a common high frequency generator. A preliminary condition for faultless solder connections, however, is that the two solder locations heat up constantly and simultaneously. This preliminary condition, however, is only present when homogeneous, non-corroding material is employed for the contact parts or when the surface layer thicknesses are constant given electrically treated contact parts. Given different surface layer thicknesses and heating via high frequency, non-uniform heating of the solder locations follows because of skin effect. This results in the fact that individual solder locations can be overheated. Increased spoilage is then the result. In order to prevent the latter, it was hitherto necessary to very precisely monitor the layer thicknesses of the electrical surfaces.

SUMMARY OF THE INVENTION

An object of the invention is to further develop a method of the type described above such that overheating of individual solder locations is no longer possible in the production of contact connections, particularly upon employment of electrically insulated coated contact parts. The inventive method is characterized in that each solder location has a temperature measuring device allocated to it with which the temperature of this solder location is monitored. Preferably, the heat source allocated to this solder location is switched off after attainment of the necessary melting or, respectively, soldering temperature.

It is particularly advantageous in the production of only one contact connection that the contact piece lie at one pole and the wire lie at the other pole of an electric control current circuit and that the galvanic contact between wire and contact piece arising when the lacquer insulation of the wire melts off be employed for switching off the heat source, and that the maximum temperature of the solder location be monitored with the assistance of the temperature measuring device. Given simultaneous production of two contact connections to a common wire, one pole of a control current circuit is preferably applied to each of the contact parts, said control current circuit being closed when the lacquer insulation melts off at the ends of the wire and switching the two heat sources off. The maximum temperature of these solder locations is monitored with the assistance of the temperature measuring device allocated to each solder location. Due to this double monitoring of the solder locations, there thus results a system which both prevents an overheating of individual solder locations and also guarantees the shortest possible solder time and, thus the lowest thermal load of the coil wires. This is of decisive significance for product quality. The solder location temperature can be identified contact-free, for example, via infrared devices, or via thermal elements and can be pre-set via devices known per se.

BRIEF DESCRIPTION OF THE DRAWINGS

FIG. 1 illustrates the contacting of a dynamic transducer with the soldering system of the invention; and FIG. 2 illustrates a detail according to FIG. 1 in enlarged scale.

DESCRIPTION OF THE PREFERRED EMBODIMENTS

In the application example illustrated, two solder locations 2 and 3 are to be simultaneously produced on a dynamic transducer such as a microphone 1. FIG. 2 shows solder location 2 in an enlarged illustration. The dynamic transducer 1 contains an oscillation coil 4 which is rigidly secured to a coil carrier 5. The coil carrier 5 is connected to an annular housing part 7 via a membrane 6. A contact bottom 8 and a contact ring 9 are secured to the housing part. The oscillating coil 4 freely oscillates in an air gap between a magnetic cup 7a and a pole plate 7b. A permanent magnet 7c generates the magnetic field required for the electro-acoustical speech conversion. The two wire ends 12 and 13 of the oscillating coil 4 are conducted via a channel 10 of the magnet system and a channel 11 of the housing 7. Further, they are threaded through nozzle-like apertures 14 and 15 (solder jets, nozzles or cups) in the contact bottom 8 or, respectively, in the contact ring 9 and are to be soft-soldered to these parts. In order to produce these contact connections, the two solder locations 2 and 3 are heated with the assistance of a heat source, ensuing in the illustrated sample embodiment by means of inductor loops 16 and 17 which are connected to high frequency generators 20 and 21 via lines 18 and 19. Preferably the front ends of the inductor loops 16 and 17 form spirals which are brought as close as possible to solder locations 2 and 3. A precisely apportioned amount of solder is supplied through the openings of these spirals to the solder jets or cups 14 and 15. As soon as the inductor loops 16 and 17 are supplied with high frequency energy, the solder jets 14 and 15 in contact floor 8 or, respectively, in contact ring 9 are heated.

The tin-lead solder which is situated in solder jets 14 and 15 melts and, after the insulation of the wires has melted through at approximately 220°, wets the wire ends 12 and 13 of the oscillating coil 4. Given identical heating rates of the two solder locations 2 and 3, this contacting ensues approximately simultaneously.

Two contact pins 22 and 23 which are conductively connected to the contact floor 8 or, respectively, the contact ring 9, are provided for monitoring the contacting operation, as in the device according to the German OS No. 2,739,418. A control current circuit containing a relay 24 and a current source 25 is connected to these contact pins 22 and 23. Before the two contact connections are produced, the resistance between the contact pins 22 and 23 is very high as a result of the insulated wire ends, so that relay 24 cannot respond. However, as soon as an electrical connection between wire end 12 and contact floor 8 on the one hand and wire end 13 and contact ring 9 on the other hand is produced, this resistance becomes very small so that relay 24 receives the full voltage and attracts. Thus, a signal is emitted to the OR stages 27 and 28 via a contact 26 of relay 24 and line 33, whereby the two high frequency generators 20 and 21 are switched off. Thus, the solder locations 2 and 3 can cool.

If, however, the two solder locations 2 and 3 heat at different rates, then, for example, solder jet 15 or cup in contact ring 9 reaches the soldering temperature of 200° to 250° C. first. Since the soldering temperature of the solder jet 14 in contact floor 8 has not yet been reached at this point in time, solder location 2 continues to be heated so that the danger of overheating exists at solder location 2. The two high frequency generators 20 and 21 are not switched off until the electrical connection of solder location 3 has also been produced.

In order to safely prevent an overheating of the two solder locations, temperature measuring devices 29 and 30 are provided which monitor the temperatures of the individual solder locations 2 and 3. The temperature measuring devices 29 and 30 are set to the maximum allowable temperature of the solder locations (of the solder). As soon as this temperature is perceived by one of the two temperature measuring devices 29 and 30, the corresponding high frequency generator 20 or 21 is switched off via a line 31 or 32 as well as OR gate 27 or 28, so that the solder location allocated to this high frequency generator can cool off. An inadmissible overheating of this solder jet is therefore avoided with certainty.

When finally the other solder jet reaches the required soldering temperature, then this heat source is also switched off via contact pins 22 and 23 after the insulation of the wire end has melted through, since the electrical connection of the two solder locations 2 and 3 has now been produced.

Both an overheating of the individual solder jets as well as an inadmissible extension of time can be avoided by means of the described monitoring of the two solder locations 2 and 3 with the assistance of temperature measuring devices 29 and 30 on the one hand, and, on the other hand, via contact pins 22 and 23.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A method for producing at least two contact connections at at least two solder locations between a lacquer-insulated wire which rapidly becomes brittle with excessive heat and corresponding contact member at each solder location of an electrical component by means of soft solder, comprising the steps of: providing an apportioned solder amount and a separate high frequency generator heat source which is allocated to each of said at least two solder locations; providing a temperature measuring device at each solder location by which a temperature of the solder location is monitored; switching on the heat sources; switching off both heat sources simultaneously when an electrical contact is established between both lacquer-insulated wires and their contact members as determined by current flow from one of the contact members through the lacquer insulated wire to the other contact member with the two contact connections being series connected by said electrical component and when a predetermined maximum temperature has not been attained at either location; monitoring a temperature at both soldering locations and switching off one of the heat sources before the other if the temperature measured at said one soldering location exceeds said predetermined maximum prior to electrical contact at both solder locations and while continuing to heat the other location until either said maximum temperature is attained or wire contact at both solder locations is achieved.

* * * * *